United States Patent

[11] 3,595,077

| [72] | Inventor | Earl Stuart Perkins |
| --- | --- | --- |
|  |  | Oak Brook, Ill. |
| [21] | Appl. No. | 826,529 |
| [22] | Filed | May 21, 1969 |
| [45] | Patented | July 27, 1971 |
| [73] | Assignee | Butler National Corporation |
|  |  | Oak Brook, Ill. |

[54] ALTIMETER
6 Claims, 2 Drawing Figs.

[52] U.S. Cl. .................................................. 73/178, 73/384
[51] Int. Cl. .................................................. G01c 21/00
[50] Field of Search ........................................... 73/384, 386, 387, 178; 116/129

[56] References Cited
UNITED STATES PATENTS
2,930,035  3/1960  Altekruse .................... 73/178 X
FOREIGN PATENTS
123,679  10/1948  Sweden ........................ 73/178

Primary Examiner—Donald O. Woodiel
Attorney—Hill, Sherman, Meroni, Gross & Simpson ABSTRACT: An altimeter which continuously presents to the pilot of an aircraft the altitude of the aircraft above ground and in which the ground reference moves relative to a fixed sea level reference with inputs to the altimeter being supplied by barometric altimeters and absolute altimeters. A pair of moving belts are supported between two pairs of rollers and carry indicia for showing the relationship between the aircraft, sea level and the ground beneath the aircraft.

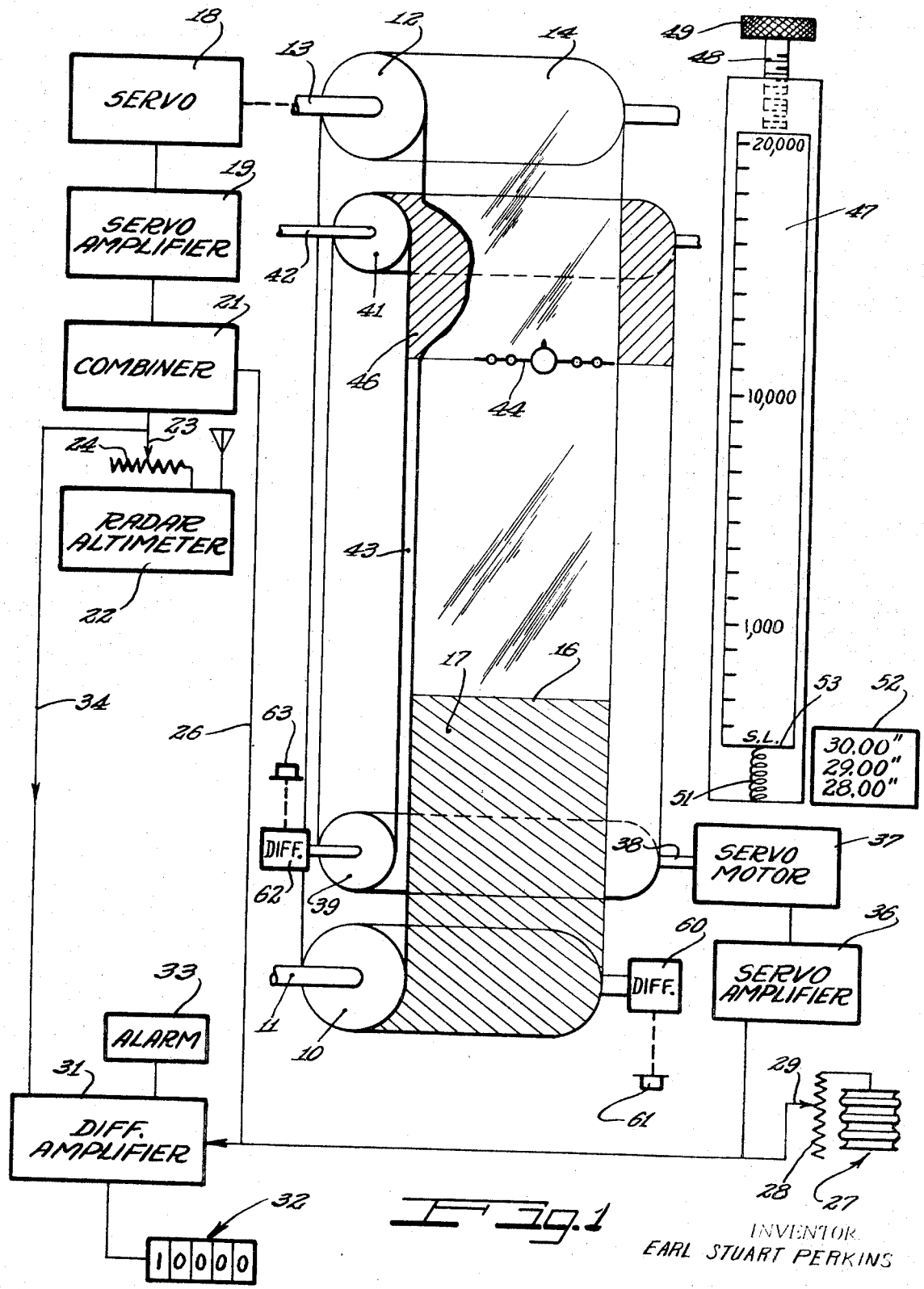

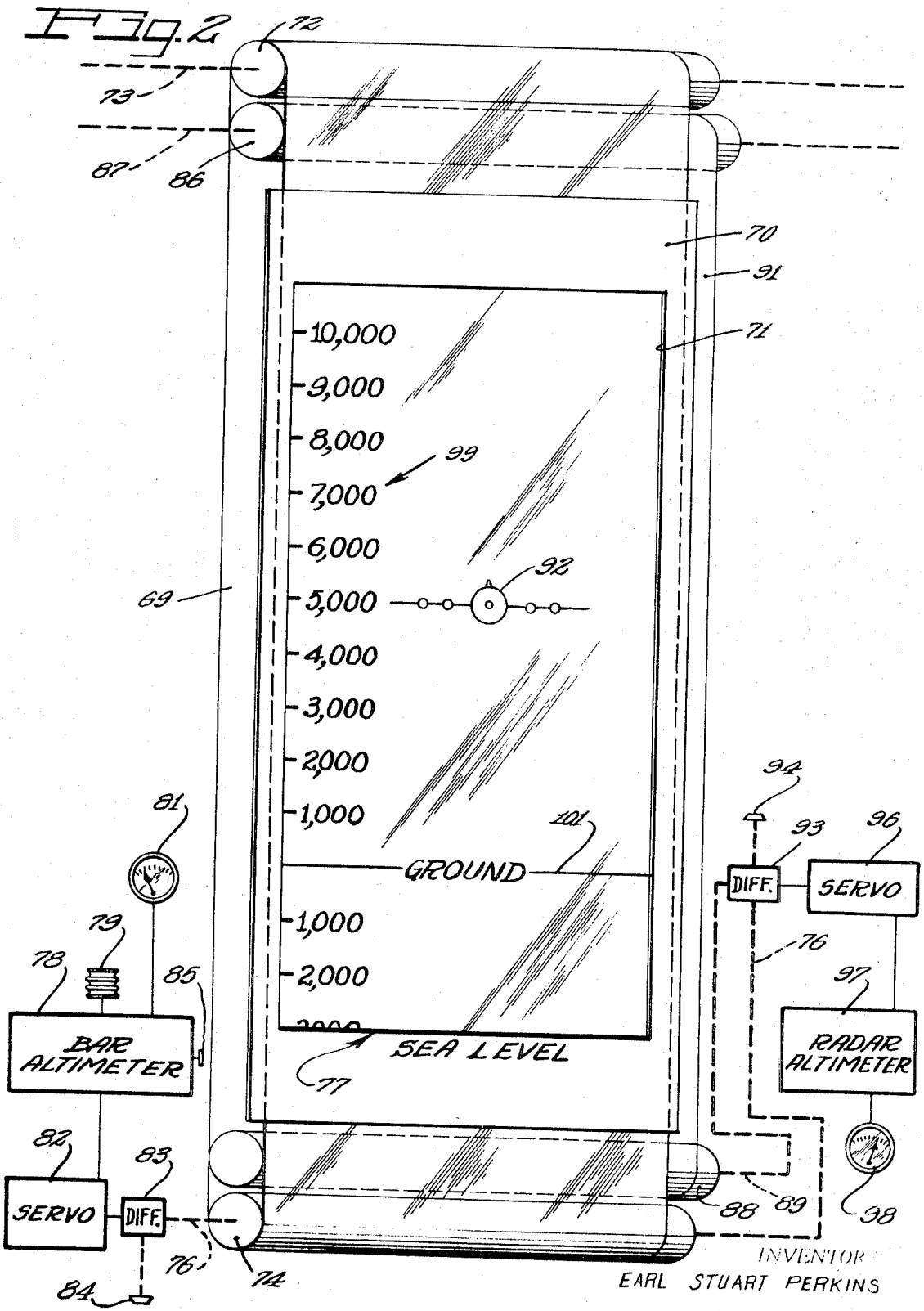

ALTIMETER

BACKGROUND OF THE INVENTION

1. Field of the Invention

This invention relates in general to altimeters and in particular to a combination altimeter for presenting altitude based on the absolute altitude above ground and barometric altitude obtained from a barometric altimeter.

2. Description of the Prior Art

It is very important in aircraft to continuously know the altitude. Altitude is normally referenced to sea level because barometric altimeters indicate altitude as a function of the pressure which varies with the height above sea level. On the other hand, absolute altimeters such as radar altimeters, transmit radio signals which are reflected from the ground plane to indicate the altitude of aircraft above the ground. It is conventional to set the barometric altimeter to the elevation of the field from which flight is initiated and it is desirable for the pilot to know at all times his altitude above the ground as well as the elevation of the ground immediately below the aircraft above sea level.

SUMMARY OF THE INVENTION

It is an object of the present invention to provide an altimeter which combines the best features of a radio altimeter with the best features of a barometric altimeter to indicate to the pilot the altitude of the craft above the ground at all times and to simultaneously indicate the elevation of the ground below the aircraft above sea level.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 illustrates an improved altitude indicator of the invention; and

FIG. 2 illustrates a modification of the improved altimeter of the invention.

DESCRIPTION OF THE PREFERRED EMBODIMENTS

FIG. 1 illustrates a first roller 10 which is rotatably supported by a shaft 11 mounted in suitable bearings and a second roller 12 mounted on the output shaft 13 of a servomotor 18. A belt 14 is supported between the rollers 10 and 12 and a ground indicia 16 printed thereon. A portion 17 of the belt 14 below the ground indicia 16 is printed to provide a contrast with the portion above the ground plane 16.

A second pair of rollers 39 and 41 are mounted on shafts 42 and 38, respectively, and support a second endless belt 43 which carries an aircraft indicia 44 and has a portion 46 above the aircraft indicia 44 which is of contrasting color. The belt 14 is translucent so that the aircraft indicia and portion 46 may be seen through the belt 14 and the position of the aircraft 44 relative to the ground plane 16 indicates the height of the aircraft above the ground plane.

The position of the ground plane indicator 16 relative to sea level is indicated by the position of the indicator 16 relative to the fixed indicia 47 which is mounted adjacent the belts 14 and 43. The sea level indicator 47 comprises a rigid rectangular plate that is mounted in a suitable guide and which has a spring 51 to bias it toward a positioning setscrew 48 that has a knob 49. A Kollsman number setting device 52 provides indicia adjacent the sea level reference 53 on the member 47 and adjustment of the setscrew 48 by the knob 49 allows the Kollsman number to be set by the sea level indicia 53 against the particular Kollsman number which exists at that particular time. The Kollsman number may be obtained by a pilot by radio and may be set into the instrument by positioning the indicia 53 relative to the indicia 52.

A servomotor 18 is connected to the shaft 13 and receives an input from the servoamplifier 19. A combiner 21 receives an input signal through lead 26 from an aneroid altimeter 27 which has an output pot 28 and a wiper contact 29. The potentiometer 28 may be a logarithmic wound potentiometer. The altimeter positions the wiper contact 29 so as to produce an electrical signal indicative of the barometric altitude. The combiner 21 also receives a signal from a radar altimeter 22 which has an output potentiometer 24 that has a wiper contact 23. The potentiometer 24 may be a logarithmic potentiometer. Thus, the servomotor 18 will position the ground plane indicia 16 relative to the sea level indicia 53 to indicate the height of the ground plane above sea level at any particular point to which the aircraft is located.

A difference amplifier 31 receives output from the altimeter 22 through the lead 34 and an input from the altimeter 27 and produces an output at indicator 32 which indicates the altitude of the aircraft above the ground. An alarm 33 receives an output from the differential amplifier 31 to produce an alarm if the height of the aircraft above the ground decreases to a preset minimum.

The belt 43 is driven by servomotor 37 which is connected to shaft 38 to position the aircraft indicia 44. The servomotor 37 receives an input signal from lead 26.

In operation, the pilot sets the sea level indicator 53 to the proper Kollsman number by adjustment of the knob 49. While on the ground the ground reference 16 may be set to the known elevation of the field at which the aircraft is located by knob 61 which is connected by differential 60 to the shaft 11. At the same time the belt 43 may be adjusted to move the aircraft indicia 44 to coincide with the ground plane by moving a knob 63 which is connected to a differential 62 which drives shaft 38 to position the belt 43. Thus, the aircraft indicia 44 and ground plane 16 will be set at the elevation of the field before takeoff.

As the aircraft takes off and climbs the aircraft 44 will be moved above the ground plane by the servomotor 37 and the pilot may observe his altitude relative to sea level by noting the position of the indicia 44 relative to the scale 47. Simultaneously, the altitude of the aircraft above the ground plane 16 will be noted. As the aircraft moves over terrain which varies in elevation from the elevation of the field, the ground plane indicia 16 will move relative to the scale 47 because such variation is detected by the radar altimeter 22 and the aneroid altimeter 27. Thus, if the aircraft passes over ground which has higher elevation than the field from which takeoff occurred, the indicia 16 will move upwardly relative to the scale 47.

Thus, at all times the pilot observes his altitude above sea level as well as above the ground plane 16 and also knows the elevation of the ground plane below the aircraft at a particular time.

If the altitude above the ground plane decreases to a predetermined minimum the alarm 33 will sound and the pilot will be warned that he is too close to the ground and can take corrective action.

FIG. 2 illustrates a modification of the invention and comprises a plate 70 formed with a window 71. The first endless belt 69 is supported on rollers 72 and 74 which are carried by shafts 73 and 76, respectively. An aircraft indicia 92 is printed on the belt 69 and indicates by its position above the bottom of the window 71 the altitude of the aircraft above sea level. The sea level indication is printed on the bottom of the window 71 and is indicated by the numeral 77.

A second pair of rollers 86 and 88 are mounted within the belt 69 and carry an endless belt 91. The endless belt 91 has a ground plane indicia 101 printed thereon and altitude indicia 99 printed along one edge. The roller 86 is mounted on shaft 87 and roller 88 is mounted on shaft 89. A barometric altimeter 78 receives an input from the bellows 79 and has a Kollsman number setting knob 85. Indicator 81 indicates the barometric altitude from the altimeter 78. A servomotor 82 has an output shaft which is connected to a differential 83 which has an output shaft connected to the shaft 76 which supports the roller 74. An adjusting knob 84 is attached to the differential 83.

A differential 93 has an output shaft 89 connected to the roller 88 and receives an input from shaft 76 and another input from the output shaft of a servomotor 96 which receives an input from the radar altimeter 97. An indicator 98 indicates the altitude of the aircraft above the ground plane. An adjusting knob 94 also supplies an input to the differential 93.

The belt 69 is transparent so that the indicia 99 and ground plane indicator 101 are visible through the belt 69.

In operation, while the aircraft is on the ground, the pilot adjusts the belt 91 by setting the knob 85 into the altimeter 78 and by adjusting knob 94 to move roller 88 and the ground reference 101 until it indicates the proper elevation above the sea level reference 77. For example, if the elevation of the field is 3,000 feet, the ground reference 101 will be set as shown to indicate that the ground level is 3,000 feet above sea level. After the ground plane 101 has been set to the proper elevation the knob 84 is used to assure that the aircraft indicia 92 corresponds with the ground plane 101.

As the aircraft is flown the aircraft indicia 92 will move above the ground plane 101 and the altitude of the aircraft above the ground plane may be observed by noting the indicia at the end of the wing of the aircraft indicia 92. If the aircraft passes over terrain which has a different elevation from that at which takeoff occurred, the radar altimeter and barometric altimeter will drive the ground indicia 101 to the proper elevation above sea level.

It is to be noted that the elevation of the ground below the aircraft is equal to the altitude above sea level as indicated by the barometric altimeter minus the altitude of the aircraft above ground as indicated by the radar altimeter. Thus, if the altitude as determined by the radar altimeter is subtracted from the barometric altitude the elevation of the ground below the aircraft will be determined. This subtraction is made in the differential 93 which receives input shaft position proportional to the barometric altitude from shaft 76 and an input from the radar altimeter from the servo 96. Thus, the proper relationship between the aircraft, the ground indicia 101 and sea level will be maintained in the instrument.

It is to be realized, of course, that the drive for the instruments may be logarithmic as in FIG. 1.

Although the invention has been described with respect to preferred embodiments, it is not to be so limited as changes and modifications may be made which are within the full intended scope as defined by the appended claims.

I claim as my invention:

1. An aircraft instrument comprising, a first movable indicia of an aircraft, a barometric altimeter connected to drive said first movable indicia, an absolute altimeter, a second movable indicia representative of the earth's surface and driven by the outputs of the absolute and barometric altimeters, a scale mounted on said instrument adjacent the first and second indicia, and means for moving said scale as a function of the Kollsman number.

2. An aircraft instrument comprising a first movable indicia of an aircraft, a barometric altimeter connected to drive said first movable indicia, an absolute altimeter, a second movable indicia representative of the earth's surface and driven by the outputs of the absolute and barometric altimeters, a first endless belt upon which said first indicia is mounted, a pair of rollers which support said first endless belt and said barometric altimeter connected to drive said first endless belt, a second endless belt upon which said second movable indicia is mounted, a second pair of rollers which supports said second belt, and the absolute and barometric altimeters connected to drive said second endless belt.

3. An aircraft instrument according to claim 2 wherein one of said endless belts is mounted within the other and the outer endless belt is transparent.

4. An aircraft instrument comprising a first movable indicia of an aircraft, a barometric altimeter connected to drive said first movable indicia, an absolute altimeter, a second movable indicia representative of the earth's surface and driven by the outputs of the absolute and barometric altimeters, and an alarm connected to the absolute and barometric altimeters to produce an alarm signal when the difference in detected altitude of the two altimeters becomes less than a predetermined amount.

5. An aircraft instrument comprising, a first movable indicia of an aircraft, a barometric altimeter connected to drive said first movable indicia, an absolute altimeter, a second movable indicia representative of the earth's surface and driven by the outputs of the absolute and barometric altimeters, a frame with a window through which said first and second indicia are visible, and a fixed reference formed on said frame adjacent said window and representative of sea level elevation.

6. An aircraft instrument according to claim 5 comprising, a first pair of rollers, a first endless belt mounted on said first rollers with the first indicia mounted thereon, a second pair of rollers, a second endless belt mounted on said second pair of rollers and said second indicia mounted thereon, and one of said endless belts mounted within the other one and said other one being transparent.